US012244051B2

(12) United States Patent
Kim et al.

(10) Patent No.: US 12,244,051 B2

(45) Date of Patent: Mar. 4, 2025

(54) ULTRA-SMALL SIZE BROADBAND COUPLER

(71) Applicant: Korea Electronics Technology Institute, Seongnam-si (KR)

(72) Inventors: Ki Jin Kim, Hwaseong-si (KR); Kwang Ho Ahn, Yongin-si (KR); Soo Chang Chae, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 242 days.

(21) Appl. No.: 17/877,165

(22) Filed: Jul. 29, 2022

(65) Prior Publication Data

US 2023/0111667 A1 Apr. 13, 2023

(30) Foreign Application Priority Data

Oct. 12, 2021 (KR) ........................ 10-2021-0134584

(51) Int. Cl.
*H01P 5/18* (2006.01)
*H01Q 7/00* (2006.01)

(52) U.S. Cl.
CPC ............... *H01P 5/186* (2013.01); *H01Q 7/00* (2013.01)

(58) Field of Classification Search
CPC .......... H01P 5/186; H01P 5/185; H01P 5/184; H01P 5/18; H01P 5/16; H01P 5/12; H01P 5/187
See application file for complete search history.

(56) References Cited

U.S. PATENT DOCUMENTS

2009/0189712 A1* 7/2009 Jiang ...................... H01P 5/185 333/116

* cited by examiner

*Primary Examiner* — Stephen E. Jones

(74) *Attorney, Agent, or Firm* — NSIP Law

(57) ABSTRACT

There is provided an ultra-small size broadband coupler. A Lange coupler according to an embodiment includes: first lines which are formed in a spiral shape, and have a first port and a second port formed at one end thereof and have connection ends formed at the other end thereof; and second lines which are formed in a spiral shape, and have connection ends formed at one end thereof to be connected to the connection ends of the first lines, and have a third port and a fourth port formed at the other end thereof. Accordingly, the Lange coupler maintains broadband characteristics while minimizing its area, so that it is possible to design a small component for mobile communication and to noticeably reduce an insertion loss.

14 Claims, 11 Drawing Sheets

ULTRA-SMALL SIZE BROADBAND COUPLER

CROSS-REFERENCE TO RELATED APPLICATION(S) AND CLAIM OF PRIORITY

This application is based on and claims priority under 35 U.S.C. § 119 to Korean Patent Application No. 10-2021-0134584, filed on Oct. 12, 2021, in the Korean Intellectual Property Office, the disclosure of which is herein incorporated by reference in its entirety.

BACKGROUND

Field

The disclosure relates to a component for communications, and more particularly, to a broadband coupler which distributes input power through broadband, and simultaneously, makes a phase difference of 90 degrees.

Description of Related Art

FIG. 1 illustrates a structure of a polyphase filter. The polyphase filter is a circuit that, when a resistor-capacitor (RC) circuit is synchronized with an operating frequency and is connected as shown in the drawing, distributes power and makes a phase of 90 degrees. This structure should have RC parallel circuits connected in multiple stages (two stages in FIG. 1) in order to make broadband. However, this may result in repeated use of a loss element R in series and may have a problem that an insertion loss reaches 5 dB or more.

FIG. 2 is a view illustrating a structure which has a Wilkinson divider and a transmission line coupled to each other, and FIG. 3 is a view expressing the structure of FIG. 2 as an equivalent circuit. The Wilkinson divider is a circuit structure that distributes broadband power, but generates an output of in-phase. Herein, the structure has a 90-degree transmission line inserted into a port 3 to make an additional phase shift of 90 degrees.

A problem of this structure lies in that an amplitude of the port 3 is lower than the other ports by 0.5 dB due to the additional transmission line as shown in FIG. 4. That is, there are problems that an amplitude unbalance appears between ports 2 and 3, and also, since a phase shift is performed only by the transmission line, a bandwidth is so narrow that a phase difference of 90 degrees is not made.

FIG. 5 shows a structure of a hybrid coupler. This structure makes a coupler by coupling 4 transmission lines of λ/4, and, when this structure is implemented in an MMIC circuit of a compound semiconductor process (an amplitude error of 0.3 dB), an amplitude has a bandwidth of 15%, and the structure is designed to have a size of 6 mm×6 mm (with reference to 4.5 GHz).

However, a recent mobile communication system (5G system) requires a bandwidth of 20% or higher, and as shown in FIG. 6, the bandwidth of the hybrid coupler is not sufficient for the current system, and simultaneously, a chip consuming area occupied by the hybrid coupler is large as shown on the right of FIG. 5, and therefore, efficiency thereof is degraded.

FIG. 7 shows a structure of a Lange coupler. This structure has transmission lines of λ/4 cross-coupled in parallel, and, when this structure is implemented by an MMIC, it may be identified that an even smaller chip area than that in the hybrid coupler is consumed on the x-axis. However, a gap between a port 2 and a port 3 is still large, for example, 6 mm. Typically, chips may be arranged with a gap of 1 mm. Therefore, in a structure where two amplifiers are coupled, even a gap of 6 mm consumes too many chip areas. However, the Lange coupler structure has a bandwidth of 20% or higher and is suitable to broadband characteristics.

SUMMARY

The disclosure has been developed to address the above-discussed deficiencies of the related art, and an object of the present disclosure is to provide a method for implementing an ultra-small size Lange coupler having broadband characteristics.

According to an embodiment of the disclosure to achieve the above-described object, a Lange coupler includes: first lines which are formed in a spiral shape, and have a first port and a second port formed at one end thereof and have connection ends formed at the other end thereof; and second lines which are formed in a spiral shape, and have connection ends formed at one end thereof to be connected to the connection ends of the first lines, and have a third port and a fourth port formed at the other end thereof.

The connection ends of the first lines may be positioned inside the spiral shape formed by the first lines, and the connection ends of the second lines may be positioned inside the spiral shape formed by the second lines.

In addition, the Lange coupler according to an embodiment may further include inter-connection lines which connect the connection ends of the first lines and the connection ends of the second lines through vias.

In addition, the inter-connection lines may be positioned on upper portions of the first lines and the second lines.

The first lines may include a 11 line, a 12 line, a 13 line, a 14 line, the second lines may include a 21 line, a 22 line, a 23 line, a 24 line, and the inter-connection lines may include: an inter-connection line for connecting a connection end of the 11 line and a connection end of the 13 line; an inter-connection line for connecting a connection end of the 12 line and a connection end of the 21 line; an inter-connection line for connecting the connection line of the 13 line and a connection end of the 22 line; an inter-connection line for connecting a connection end of the 14 line and a connection end of the 23 line; and an inter-connection line for connecting the connection end of the 22 line and a connection end of the 24 line.

The first port may be a port that is configured by coupling an input end of a 11 line and an input end of a 13 line, the second port may be a port that is configured by coupling an input end of a 12 line and an input end of a 14 line, the third port may be a port that is configured by coupling an input end of a 21 line and an input end of a 23 line, and the fourth port may be a port that is configured by coupling an input end of a 22 line and an input end of a 24 line.

Respective lengths of the first lines and the second lines may be λ/8.

According to another embodiment of the disclosure, a Lange coupling method includes: receiving a signal through a first port and a second port formed at one end of first lines; and outputting a signal through a third port and a fourth port which are formed at the other end of second lines which have one end connected to the first lines, and the first lines are formed in a spiral shape, and have the first port and the second port formed at one end thereof and have connection ends formed at the other end thereof, and the second lines are formed in a spiral shape, and have connection ends formed at one end thereof to be connected to the connection ends of the first lines, and have the third port and the fourth port formed at the other end thereof.

According to embodiments of the disclosure as described above, the Lange coupler may maintain broadband characteristics while minimizing its area, so that it is possible to design a small component for mobile communication and to noticeably reduce an insertion loss.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

Embodiments of the disclosure propose a structure of an ultra-small size broadband Lange coupler. Compared to related-art couplers which have a large volume to implement broadband and cause an insertion loss to increase, the Lange coupler according to an embodiment may reduce a volume by dividing lines and implementing in a spiral shape, and may minimize an insertion loss by connecting the divided lines through via-connection.

Figure 1:
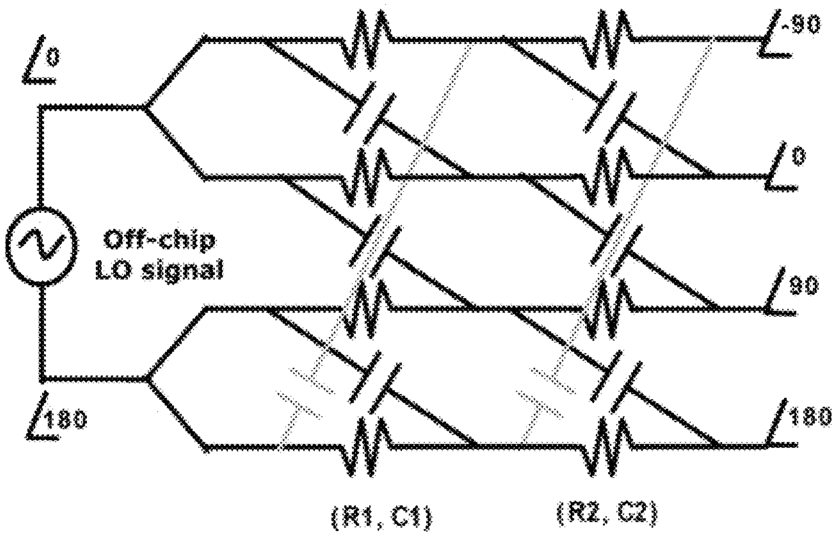
FIG. 1 (Related Art)
FIG. 1 is a view illustrating a polyphase filter structure.
Figure 2:
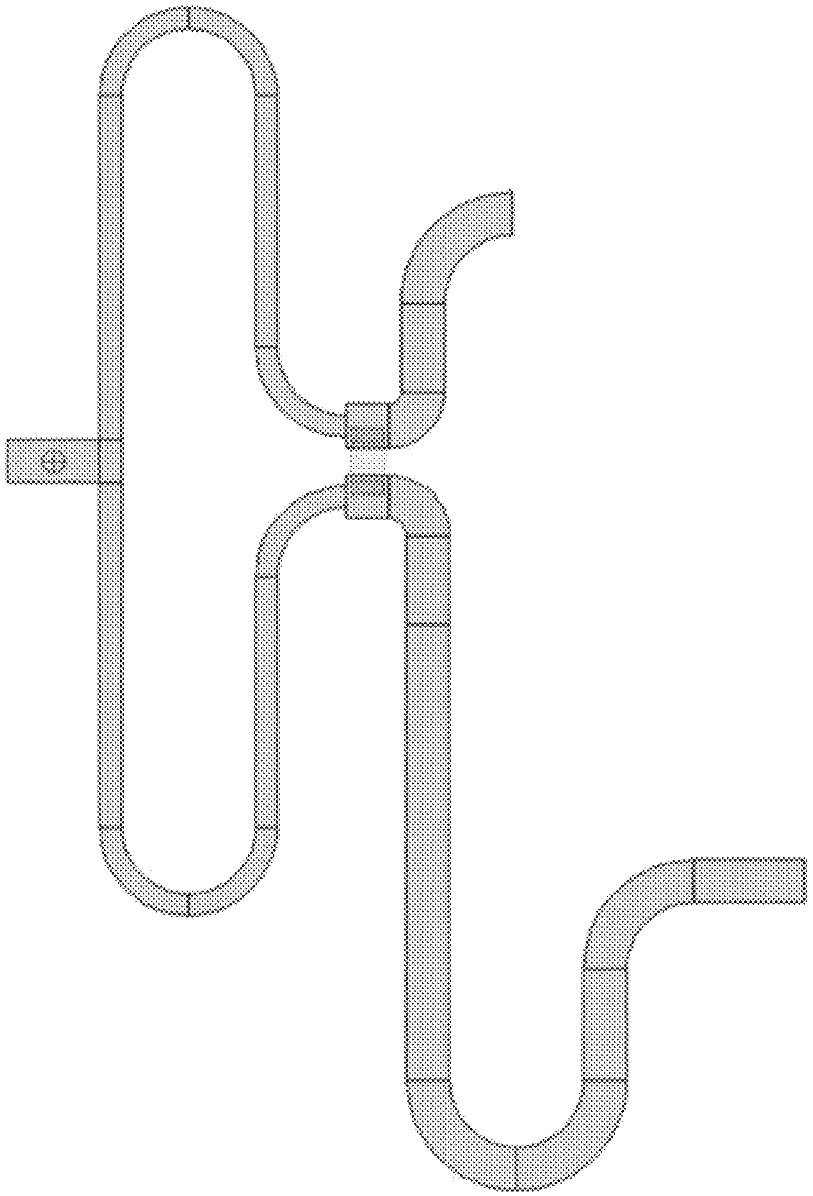
FIG. 2 (Related Art)
FIGS. 2 and 3 are views illustrating a structure which has a Wilkinson divider and a transmission line coupled to each other.
Figure 3:
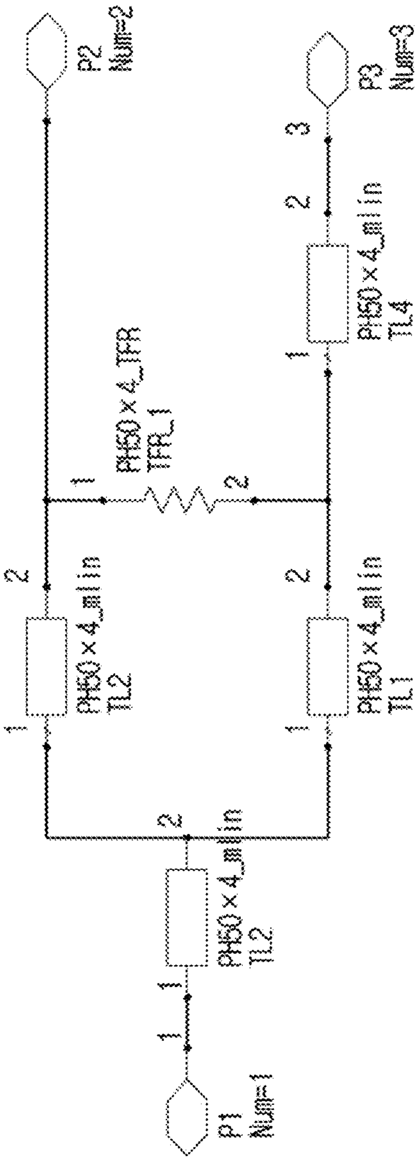
FIG. 3 (Related Art)
Figure 4:
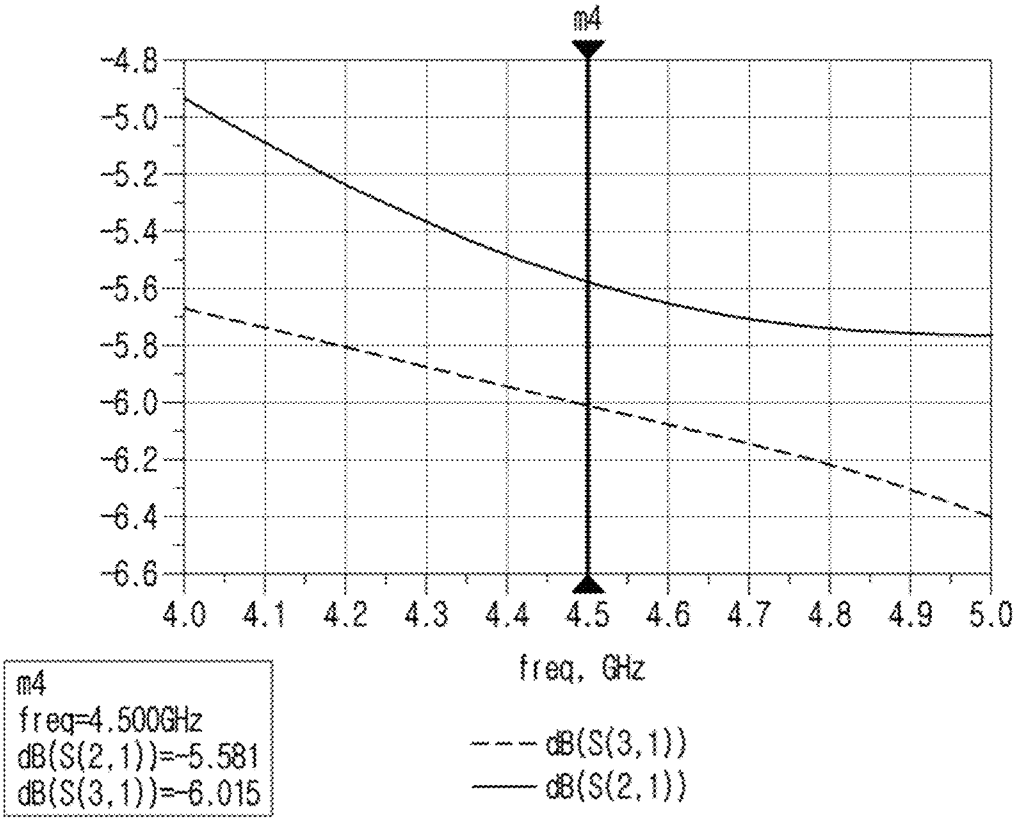
FIG. 4 (Related Art)
FIG. 4 is a view illustrating an insertion loss of the structure having the Wilkinson divider and the transmission line coupled to each other.
Figure 5:
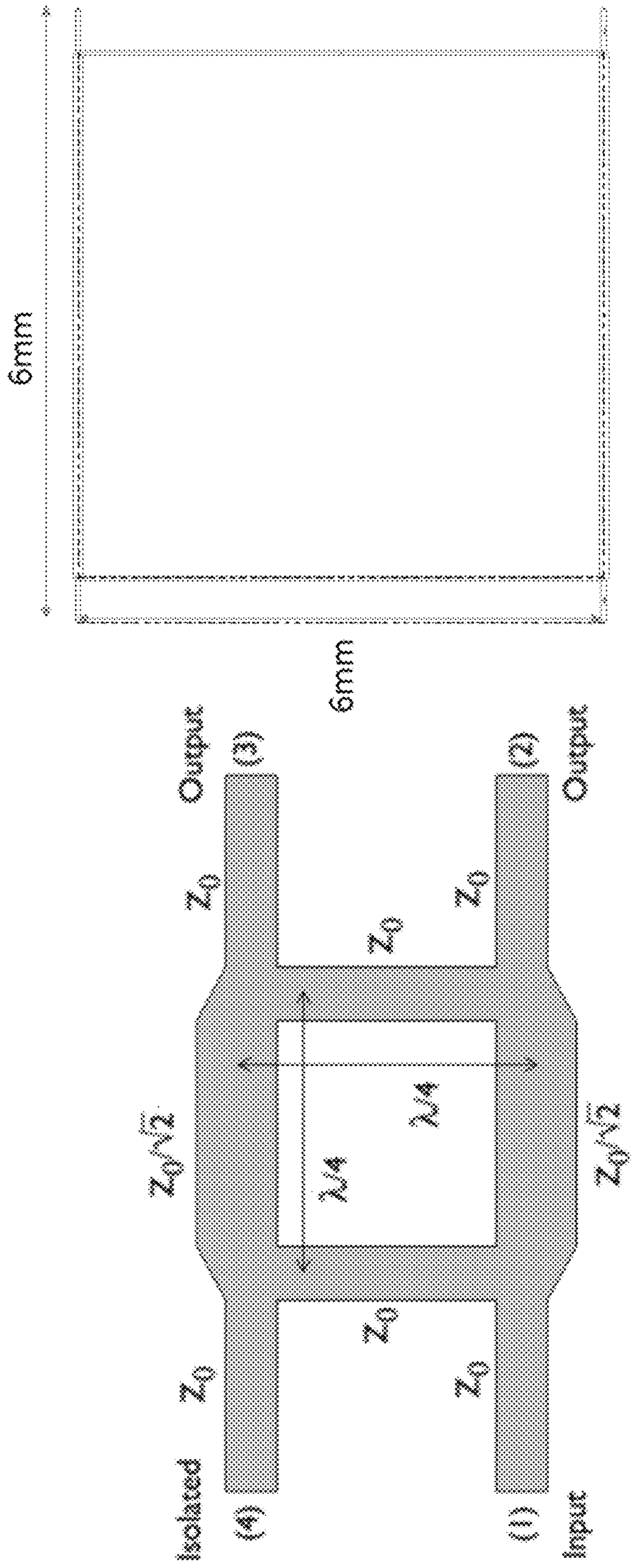
FIG. 5 (Related Art)
FIG. 5 is a view illustrating a hybrid coupler structure.
Figure 6:
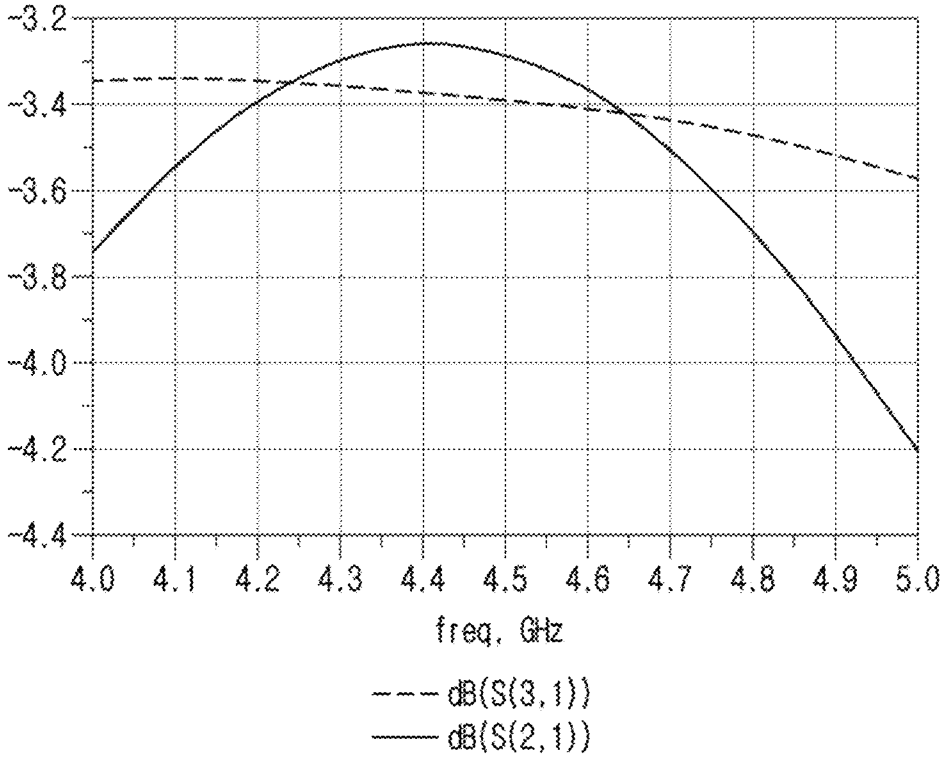
FIG. 6 (Related Art)
FIG. 6 is a view illustrating an insertion loss of the hybrid coupler.
Figure 7:
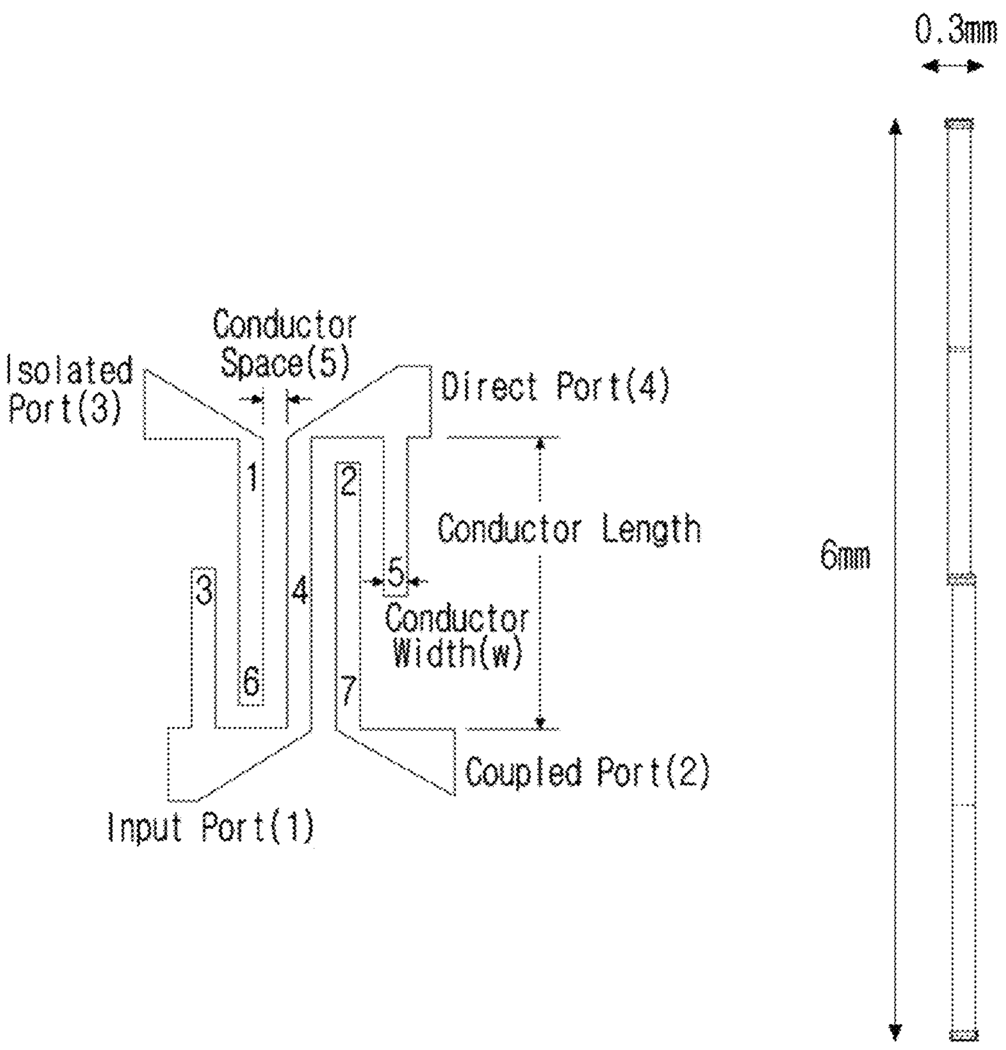
FIG. 7 (Related Art)
FIG. 7 is a view illustrating a structure of a Lange coupler.
Figure 8:
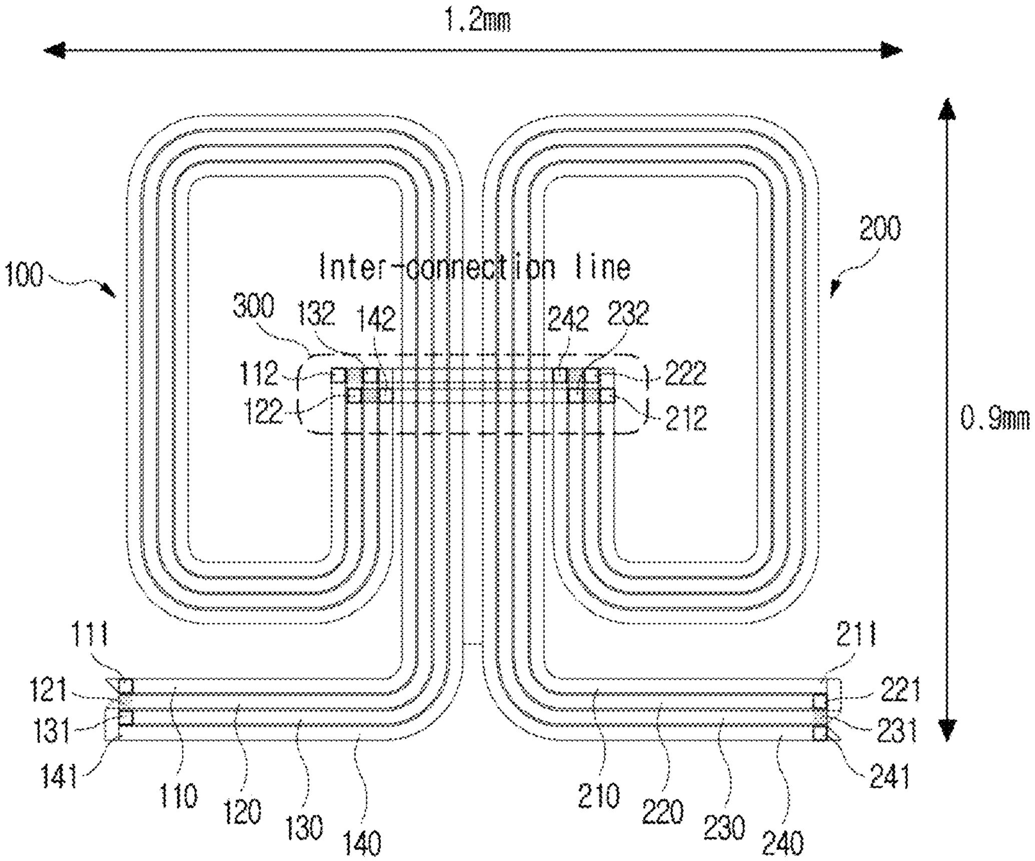
FIG. 8 is a view illustrating a structure of a Lange coupler according to an embodiment of the disclosure.

FIG. 8 is a view illustrating a structure of a Lange coupler according to an embodiment. The Lange coupler according to an embodiment may include input lines 100, output lines 200, and inter-connection lines 300 as shown in the drawing.

The input lines 100 and the output line 200 are formed in a spiral shape, and are symmetric to each other. Lengths of the input lines 100 and the output lines 200 are λ/8, respectively.

That is, a line of λ/4 of the Lange coupler according to an embodiment may be divided into two lines of λ/8, and may be implemented in a spiral shape in order to reduce a size. Accordingly, the Lange coupler according to an embodiment may be implemented to have an ultra-small size of 1.2 mm×0.9 mm.

The input lines 100 may be configured with four lines 110, 120, 130, 140, and the output lines 200 may be configured with four lines 210, 220, 230, 240.

An input port and a coupled port may be formed at one end of the input lines 100. Although not shown in FIG. 8, the input port may be configured by coupling an input end 111 of the line-1 110 and an input end 131 of the line-3 130, and the coupled port may be configured by coupling an input end 121 of the line-2 120 and an input end 141 of the line-4 140.

Connection ends 112, 122, 132, 142 may be formed at the other end of the input lines 100 to be connected with the output lines 200. The connection ends 112, 122, 132, 142 may be positioned inside the spiral shape formed by the input lines 100.

Connection ends 212, 222, 232, 242 may be formed at one of the output lines 200 to be connected with the connection ends 112, 122, 132 142 of the input lines 100. The connection ends 212, 222, 232, 242 may be positioned inside the spiral shape formed by the output lines 200.

An isolated port and a direct port may be formed at the other end of the output lines 200. Although not shown in FIG. 8, the isolated port may be configured by coupling an input end 211 of the line-1 210 and an input end 231 of the line-3 230, and the direct port may be configured by coupling an input end 221 of the line-2 220 and an input end 241 of the line-4 240.

The inter-connection lines 300 may be lines for connecting the connection ends 112, 122, 132, 142 of the input lines 100 and the connection lines 212, 222, 232 242 of the output lines 200.

Since the connection ends 112, 122, 132, 142 of the input lines 100 are positioned inside the spiral shape and the connection ends 212, 222, 232, 242 of the output lines 200 are positioned inside the spiral shape, the inter-connection lines 300 may couple the connection ends 112, 122, 132, 142 of the input lines 200 and the connection ends 212, 222, 232, 242 of the output lines 200 through vias. That is, the inter-connection lines 300 may be formed on upper layers of the input lines 100 and the output lines 200 to connect the connection ends 112, 122, 132, 142 of the input lines 100 and the connection ends 212, 222, 232, 242 of the output lines 200.

The inter-connection lines 300 may include five (5) inter-connection lines although they are not illustrated in FIG. 8.

The inter-connection line-1 may be a line for connecting the connection end 112 of the input line-1 110 and the connection end 132 of the input line-3 130.

The inter-connection line-2 may be a line for connecting the connection end 122 of the input line-2 120 and the connection end 212 of the output line-1 210.

The inter-connection line-3 may be a line for connecting the connection end 132 of the input line-3 130 and the connection end 222 of the output line-2 220.

The inter-connection line-4 may be a line for connecting the connection end 142 of the input line-4 140 and the connection end 232 of the output line-3 230.

The inter-connection line-5 may be a line for connecting the connection end 222 of the output line-2 220 and the connection end 242 of the output line-4 240.

The inter-connection lines 300 do not greatly influence the size of the broadband Lange coupler according to an embodiment. That is, a horizontal length or a vertical length of the broadband Lange coupler according to an embodiment does not increase due to the inter-connection lines 300.

Figure 9:
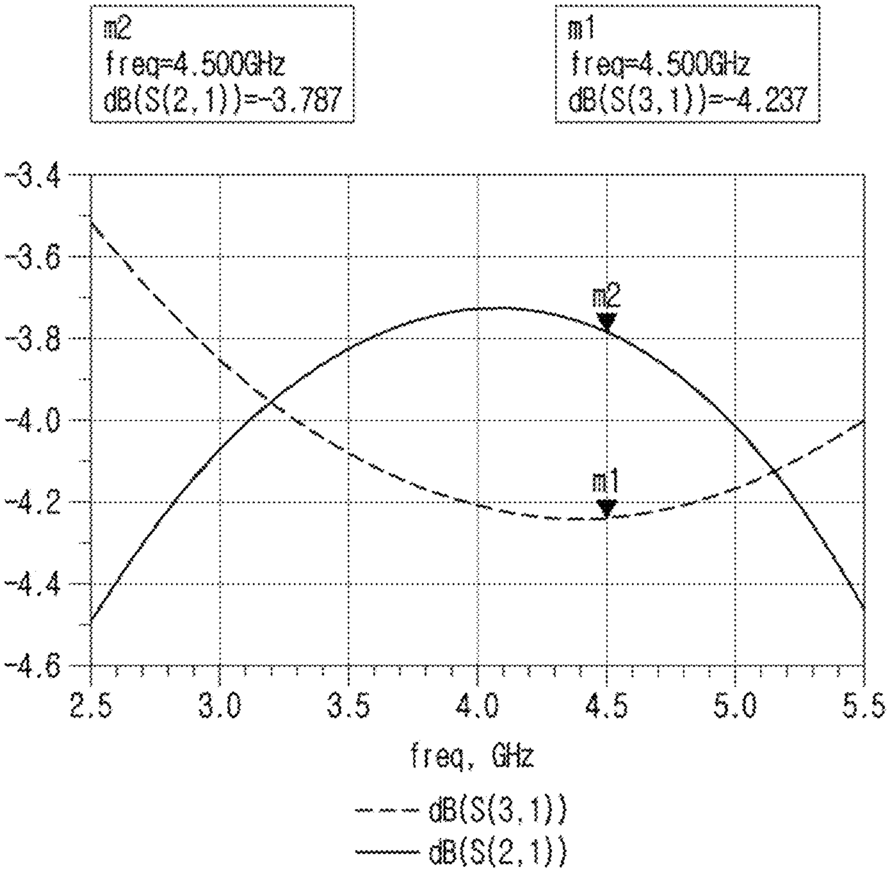
FIG. 9 is a view illustrating a result of simulating amplitude characteristics of the broadband Lange coupler according to an embodiment of the disclosure.

A result of simulating amplitude characteristics of the broadband Lange coupler according to an embodiment is illustrated in FIG. 9. Referring to a bandwidth reduced by 0.3 dB, a bandwidth characteristic of 40% is shown, and therefore, it can be seen that the broadband Langer coupler has a broader bandwidth than a related-art Lange coupler.

Figure 10:
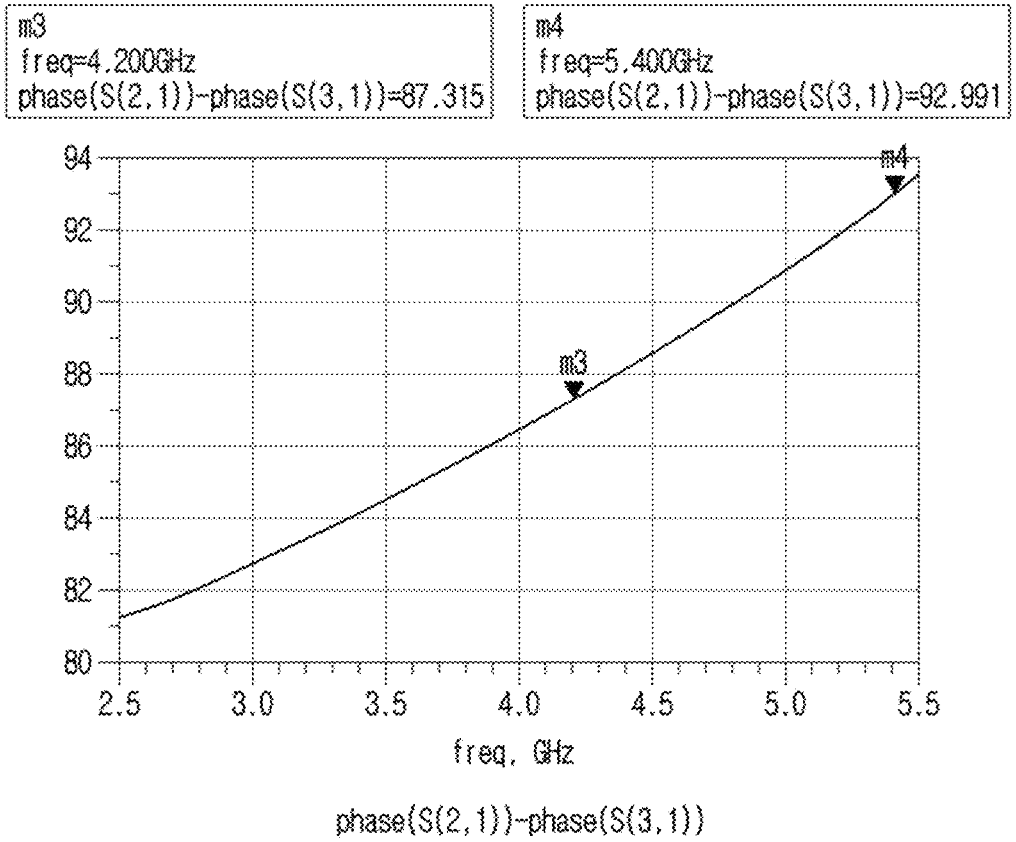
FIG. 10 is a view illustrating a result of simulating phase characteristics of the broadband Lange coupler according to an embodiment of the disclosure.

A result of simulating phase characteristics of the broadband Lange coupler according to an embodiment is illustrated in FIG. 10. If a bandwidth is defined with reference to phase distortion of 3 degrees, the broadband Lange coupler according to an embodiment has a bandwidth of 26% and shows a characteristic appropriate to 90-degree coupling of a broadband signal as in a 5G system.

Figure 11:
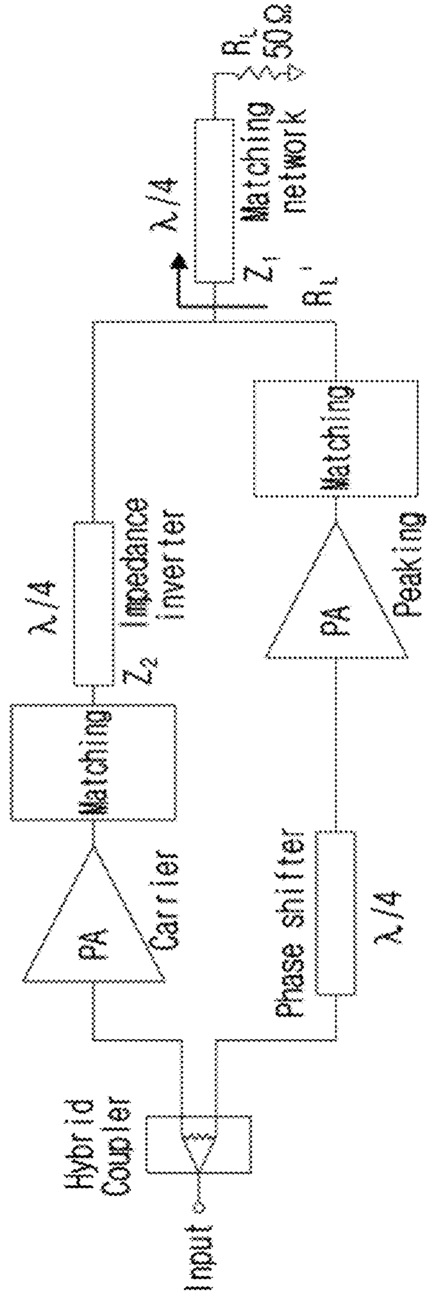
FIG. 11 is a view illustrating a structure of a Doherty amplifier to which the broadband Lange coupler according to an embodiment of the disclosure is applied.

FIG. 11 illustrates a structure of a Doherty amplifier to which the broadband Lange coupler according to an embodiment is applied. A hybrid coupler which includes a Wilinson divider and a transmission line of λ/4 among configurations of the illustrated Doherty amplifier may be substituted with the broadband Lange coupler according to an embodiment.

Up to now, the ultra-small size broadband coupler has been described in detail with reference to preferred embodiments.

In the above-descried embodiments, there is proposed an ultra-small size broadband coupler which divides RF broadband power in next-generation mobile communication, and maintains broadband characteristics while reducing its area, so that an insertion loss and a cost can be reduced when the ultra-small size broadband coupler is employed in a system.

The ultra-small size Lange coupler according to an embodiment may be utilized in designing an RF circuit, and particularly, may be used for an MMIC circuit like a Doherty power amplifier, and also, may be applied to an active phase shifter using a 90-degree phase difference in a recent beamforming component.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A Lange coupler comprising:

first lines which are formed in a spiral shape, and have a first port and a second port formed at one end thereof and have connection ends formed at the other end thereof; and second lines which are formed in a spiral shape, and have connection ends formed at one end thereof to be connected to the connection ends of the first lines, and have a third port and a fourth port formed at the other end thereof, wherein respective lengths of the first lines and the second lines are λ/8.

2. The Lange coupler of claim 1, wherein the connection ends of the first lines are positioned inside the spiral shape formed by the first lines, and wherein the connection ends of the second lines are positioned inside the spiral shape formed by the second lines.

3. The Lange coupler of claim 2, further comprising inter-connection lines which connect the connection ends of the first lines and the connection ends of the second lines through vias.

4. The Lange coupler of claim 3, wherein the inter-connection lines are positioned on upper portions of the first lines and the second lines.

5. The Lange coupler of claim 4, wherein the first lines comprise a 11 line, a 12 line, a 13 line, a 14 line, wherein the second lines comprise a 21 line, a 22 line, a 23 line, a 24 line, and wherein the inter-connection lines comprise:

an inter-connection line for connecting a connection end of the 11 line and a connection end of the 13 line;

an inter-connection line for connecting a connection end of the 12 line and a connection end of the 21 line;

an inter-connection line for connecting the connection line of the 13 line and a connection end of the 22 line;

an inter-connection line for connecting a connection end of the 14 line and a connection end of the 23 line; and an inter-connection line for connecting the connection end of the 22 line and a connection end of the 24 line.

6. The Lange coupler of claim 1, wherein the first port is a port that is configured by coupling an input end of a 11 line and an input end of a 13 line, wherein the second port is a port that is configured by coupling an input end of a 12 line and an input end of a 14 line, wherein the third port is a port that is configured by coupling an input end of a 21 line and an input end of a 23 line, and wherein the fourth port is a port that is configured by coupling an input end of a 22 line and an input end of a 24 line.

7. A Lange coupler comprising:

first lines which are formed in a spiral shape, and have a first port and a second port formed at one end thereof and have connection ends formed at the other end thereof; and second lines which are formed in a spiral shape, and have connection ends formed at one end thereof to be connected to the connection ends of the first lines, and have a third port and a fourth port formed at the other end thereof, wherein the connection ends of the first lines are positioned inside the spiral shape formed by the first lines, wherein the connection ends of the second lines are positioned inside the spiral shape formed by the second lines, and wherein the Lange coupler further comprises inter-connection lines which connect the connection ends of the first lines and the connection ends of the second lines through vias, wherein the inter-connection lines are positioned on upper portions of the first lines and the second lines.

8. The Lange coupler of claim 7, wherein the first lines comprise a 11 line, a 12 line, a 13 line, a 14 line, wherein the second lines comprise a 21 line, a 22 line, a 23 line, a 24 line, and wherein the inter-connection lines comprise:

an inter-connection line for connecting a connection end of the 11 line and a connection end of the 13 line;

an inter-connection line for connecting a connection end of the 12 line and a connection end of the 21 line;

an inter-connection line for connecting the connection line of the 13 line and a connection end of the 22 line;

an inter-connection line for connecting a connection end of the 14 line and a connection end of the 23 line; and an inter-connection line for connecting the connection end of the 22 line and a connection end of the 24 line.

9. A Lange coupling method comprising:

receiving a signal through a first port and a second port formed at one end of first lines; and outputting a signal through a third port and a fourth port which are formed at the other end of second lines which have one end connected to the first lines, wherein the first lines are formed in a spiral shape, and have the first port and the second port formed at one end thereof and have connection ends formed at the other end thereof, wherein the second lines are formed in a spiral shape, and have connection ends formed at one end thereof to be connected to the connection ends of the first lines, and have the third port and the fourth port formed at the other end thereof, and wherein respective lengths of the first lines and the second lines are λ/8.

10. The Lange coupling method of claim 9, wherein the connection ends of the first lines are positioned inside the spiral shape formed by the first lines, and wherein the connection ends of the second lines are positioned inside the spiral shape formed by the second lines.

11. The Lange coupling method of claim 10, further comprising inter-connection lines which connect the connection ends of the first lines and the connection ends of the second lines through vias.

12. The Lange coupling method of claim 11, wherein the inter-connection lines are positioned on upper portions of the first lines and the second lines.

13. The Lange coupling method of claim 12, wherein the first lines comprise a 11 line, a 12 line, a 13 line, a 14 line, wherein the second lines comprise a 21 line, a 22 line, a 23 line, a 24 line, and wherein the inter-connection lines comprise:

an inter-connection line for connecting a connection end of the 11 line and a connection end of the 13 line;

an inter-connection line for connecting a connection end of the 12 line and a connection end of the 21 line;

an inter-connection line for connecting the connection line of the 13 line and a connection end of the 22 line;

an inter-connection line for connecting a connection end of the 14 line and a connection end of the 23 line; and an inter-connection line for connecting the connection end of the 22 line and a connection end of the 24 line.

14. The Lange coupling method of claim 9, wherein the first port is a port that is configured by coupling an input end of a 11 line and an input end of a 13 line, wherein the second port is a port that is configured by coupling an input end of a 12 line and an input end of a 14 line, wherein the third port is a port that is configured by coupling an input end of a 21 line and an input end of a 23 line, and wherein the fourth port is a port that is configured by coupling an input end of a 22 line and an input end of a 24 line.

* * * * *